Dec. 16, 1969 E. K. GRIP 3,484,041

ARITHMETIC UNIT FOR CALCULATING MACHINES
OF THE TEN-BUTTON KEY SET TYPE

Filed Nov. 3, 1966 5 Sheets-Sheet 1

*INVENTOR.*
ERIK KONRAD GRIP

*BY* Darby & Darby

ATTORNEYS

Dec. 16, 1969 E. K. GRIP 3,484,041

ARITHMETIC UNIT FOR CALCULATING MACHINES
OF THE TEN-BUTTON KEY SET TYPE

Filed Nov. 3, 1966 5 Sheets-Sheet 2

INVENTOR.
ERIK KONRAD GRIP
BY Darby + Darby
ATTORNEYS

Dec. 16, 1969 E. K. GRIP 3,484,041

ARITHMETIC UNIT FOR CALCULATING MACHINES OF THE TEN-BUTTON KEY SET TYPE

Filed Nov. 3, 1966 5 Sheets-Sheet 3

INVENTOR.
ERIK KONRAD GRIP

BY Darby & Darby

ATTORNEYS

INVENTOR.
ERIK KONRAD GRIP
BY Darby & Darby
ATTORNEYS

Dec. 16, 1969 E. K. GRIP 3,484,041

ARITHMETIC UNIT FOR CALCULATING MACHINES
OF THE TEN-BUTTON KEY SET TYPE

Filed Nov. 3, 1966 5 Sheets-Sheet 5

INVENTOR.
ERIK KONRAD GRIP

BY Darby + Darby

ATTORNEYS

United States Patent Office 3,484,041
Patented Dec. 16, 1969

3,484,041
ARITHMETIC UNIT FOR CALCULATING MACHINES OF THE TEN-BUTTON KEY SET TYPE

Erik Konrad Grip, Atvidaberg, Sweden, assignor to Facit AB, Atvidaberg, Sweden, a Swedish joint-stock company
Filed Nov. 3, 1966, Ser. No. 591,744
Int. Cl. G06c 23/00
U.S. Cl. 235—63 3 Claims

ABSTRACT OF THE DISCLOSURE

A calculating machine of the ten-button key set type having an actuator comprising a plurality of individually settable actuator discs or wheels, the actuator being oscillatable as a unit to enter amounts into a register and axially movable to cause engagement of the product register wheels of predetermined denominational orders with the actuator discs. The machine is capable of addition and subtraction and also of performing multiplication and division, and is arranged so that each actuator disc is provided with two permanently offset tooth tracks, one of which is brought into engagement with the register wheels to cause addition by subtraction of complements, and the other of which is brought into engagement with the register wheels to cause subtraction by subtraction of the actual number. A multiplier storage and quotient register is also provided and is arranged to sense multiplier digit values to enable multiplication to be performed by the short-cut method, which method is performed by stepping the rotor from the highest to the lowest decades, thus permitting simplification of the mechanism, since the stepping action is in the same direction for multiplication and division. Means are provided for entering the fugitive or elusive "one" in the lowest order product register wheel, which is engaged by the lowest order setting disc of the rotary or oscillating actuator during each addition, other tens transfers being performed through the use of an ordinary consecutive transfer mechanism operated during each calculating cycle of the machine.

Figure 1:
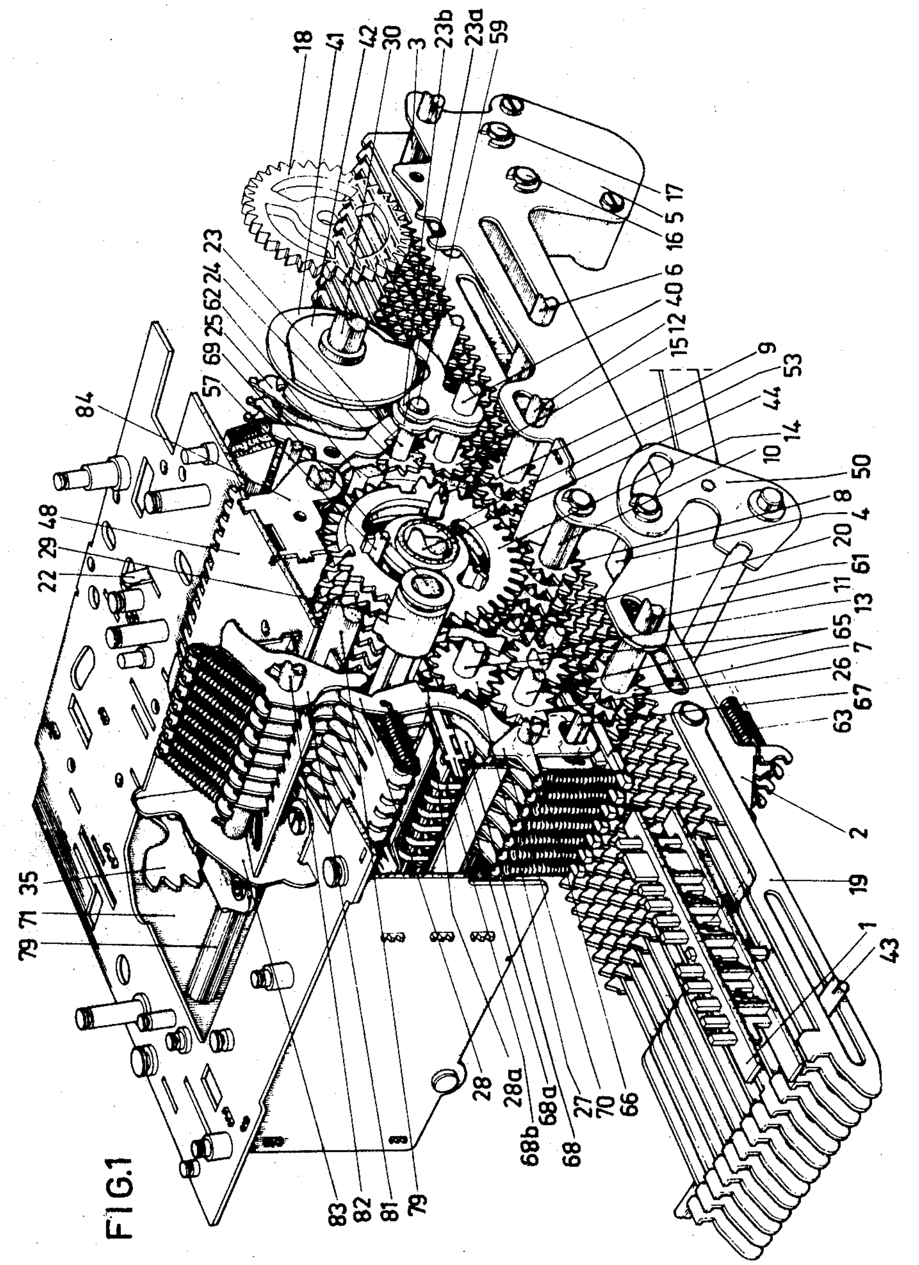

This invention relates to an arithmetic unit (including an actuator or counting rotor) for calculating machines of the ten-button key set type which machines in addition to adding and subtracting operations also automatically carry out both multiplication and division. For multiplication the multiplier is fed into a multiplier storage register and the multiplicand into the said actuator which thereafter under control of the multiplier storage register and counting means computes and feeds the result into a product register.

In conventional arrangements of the aforesaid type, the actuator is rotated a certain number of revolutions corresponding to the multiplier entered into the product register. The direction of rotation of the actuator is either reversible (the actuator counts plus and minus revolutions) or it is adapted to rotate only in one direction. In the first mentioned case the computing operation usually is carried out as a so-called shortened operation, i.e. nine times a certain figure is carried out by the actuator as ten times the figure minus one time. Constructions of this type, however, have been rather complicated, for the reason among other that heretofore multiplying operations were commenced in the lowest decade of the multiplying operations were commenced in the lowest decade of the multiplier and thereafter continued to higher decades. The reason for this was to be able to perform necessary tens transfers in the usual manner (particularly in connection with the shortened computing operation). To this end, the machine had to be equipped with means for effecting an automatic stepping to higher decades of the actuator. When the same machine is utilized for dividing operations, however, the actuator commences in the highest decade of the dividend and thereafter continues to lower decades. The machine, consequently, must be equipped with means for an automatic stepping of the actuator to lower decades.

In machines wherein the actuator is adapted to rotate only in one direction, it is known that both multiplying and dividing operations may be performed, beginning in the highest decade and stepping the actuator to lower decades for performing the calculating operations automatically. The successive tens transfer which according to the above was required in the product register can in this case be replaced by a single-step transfer of much greater simplicity since the multiplier figures of the multiplier register are arranged for different sensing areas. The digits 1 through 4, for example, can be computed positively, and the digits 5 through 9 negatively, whereat transfer means are provided for automatically increasing every figure to the left of a negatively computed figure by one unit in order to compensate for the reduction of the already computed figure due to the negative computation, in such a manner, that the said transfer device affects only the next higher decade of the figure wheel. A digit 5 computed by transfer is calculated positively whereas a digit 5 set such from the beginning is calculated negatively.

Arrangements of the aforesaid type require the actuator to be able during the decade displacement to stop in one or the other of two different axial positions for each decade, so-called half-step displacement, whereby the actuator assumes different positions of engagement with the product register and thereby is adapted to impart to the calculating wheels in the product register an additive operation in the one position and a negative operation in the other position.

In certain pervious models of this type the actuator has been a so-called pin wheel rotor whereof the pins which had been set (or turned ahead) calculated the number in an additive manner whereas the pins which had not been set calculated the complementary number in question subtractively.

In most such arangements the stepping of the actuator was carried out subsequent to the completion of the rotation operation within each decade for reducing to zero the decade figure concerned in the multiplier storage register mechanism. In this case the stepping time materially decreases the overall speed of operation.

In machines with the actuator rotating in only one direction is has been possible to overcome the aforesaid shortcoming, but in that case is has not been possible to perform the calculation in a shortened way, nor had the actuator been adapted for displacement by half steps. In the machines in question the calculation was carried out as repeated additions, which means that the machines must have additional computing means outside of the multiplier register in order to be able, for example, to perform a subtraction or a division. Besides, the product calculation took much more time than was the case with shortened multiplication, which means that such a machine must operate at a drive speed for the computing rotor which is considerably higher than otherwise required for the same operation speed.

The present invention particularly relates to calculating machines in which for multiplication the multiplier is fed into a multiplier mechanism adapted for so-called single-step transfer whereafter the multiplicand is fed into an actuator. The actuator, in carrying out the calculating operations, is displaced laterally from higher decades to lower decades, in such a manner, that the actuator senses and computes in a previously known manner by shortened multiplication the number set in the multiplier register. The stepping of the actuator is carried out immediately subsequent to the reduction of the figure in a particular order to zero and before the period or cycle in question is finished whereby the computation of the results in the next lower denominational order takes place immediately succeeding the computation in the higher order.

The result of the computation is entered in a previously known manner in a product register from which it can easily be transferred, for example, to a printing mechanism for registration. A set of intermediate wheels is connected for engagement with the product register, via which intermediate wheels the result is transferred to a set of racks which in their turn in a previously known manner transfer the result to the printing mechanism.

For division the dividend is fed via the actuator to the product register whereafter the divisor is fed into the actuator. The quotient is obtained by computation in the multiplier storage or quotient register and the result can be transferred to a printing mechanism or the like analogous to the conditions at other operations.

All calculating operations, thus, are carried out by cooperation between a product register, an actuator and a multiplying mechanism including a multiplier storage register, and the arrangement according to the invention is characterized in that the actuator is adapted to carry out a reciprocating rotary motion about a shaft, the calculating operations being carried out by the actuator as repeated subtractions of the numerical value found in the product register, in such a manner, that negative calculation is carried out with the number set in the actuator, whereas positive calculation is made by subtraction of the number value which is the nines complement of the set number.

Since negative as well as positive calculation is carried out in a single direction, a particularly favourable embodiment of the arrangement according to the invention is characterized in that the setting discs of the actuator in every decade are provided with two tooth tracks laterally offset relative to one another by half a decade division.

Depending on whether negative or positive calculation is to be carried out, the actuator is adapted to be stopped in either of two different axial positions for every decade whereby one of the tooth tracks on each actuator setting disc always assumes engaging position with the corresponding intermediate wheel for the product register.

A particularly suitable embodiment is characterized in that the set of intermediate wheels which cooperates with the calculating wheels of the product register is adapted upon the start of the actuator immediately to roll into engagement with the setting discs of the actuator and during the forward rotation of the actuator to transfer the number set in the actuator to the product register, whereafter the set of intermediate wheels is disengaged (rolls out of engagement) at the same time as the actuator commences its return rotation during which the actuator carries out the necessary decade displacements in the lateral direction.

The arithmetic unit according to the invention thus effects a speed promoting cooperation between the actuator and the product register, in that the intermediate wheels on a shift member for the calculating wheels are given the same direction of motion and circumferential speed as the actuator both at the engagement with and disengagement from the actuator, so that no unnecessary friction forces are produced at the synchronization.

Figures 2, 6:
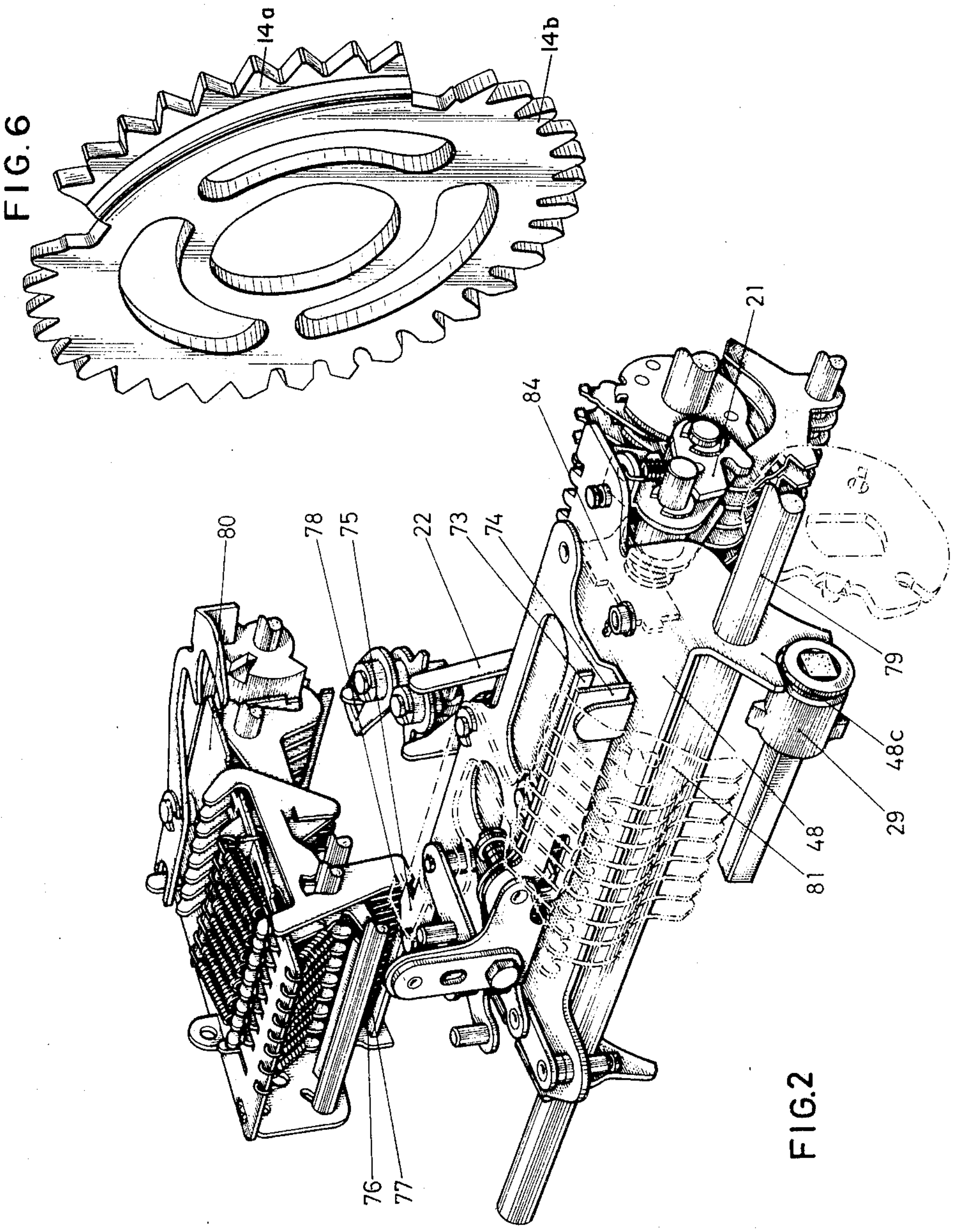
Figure 3:
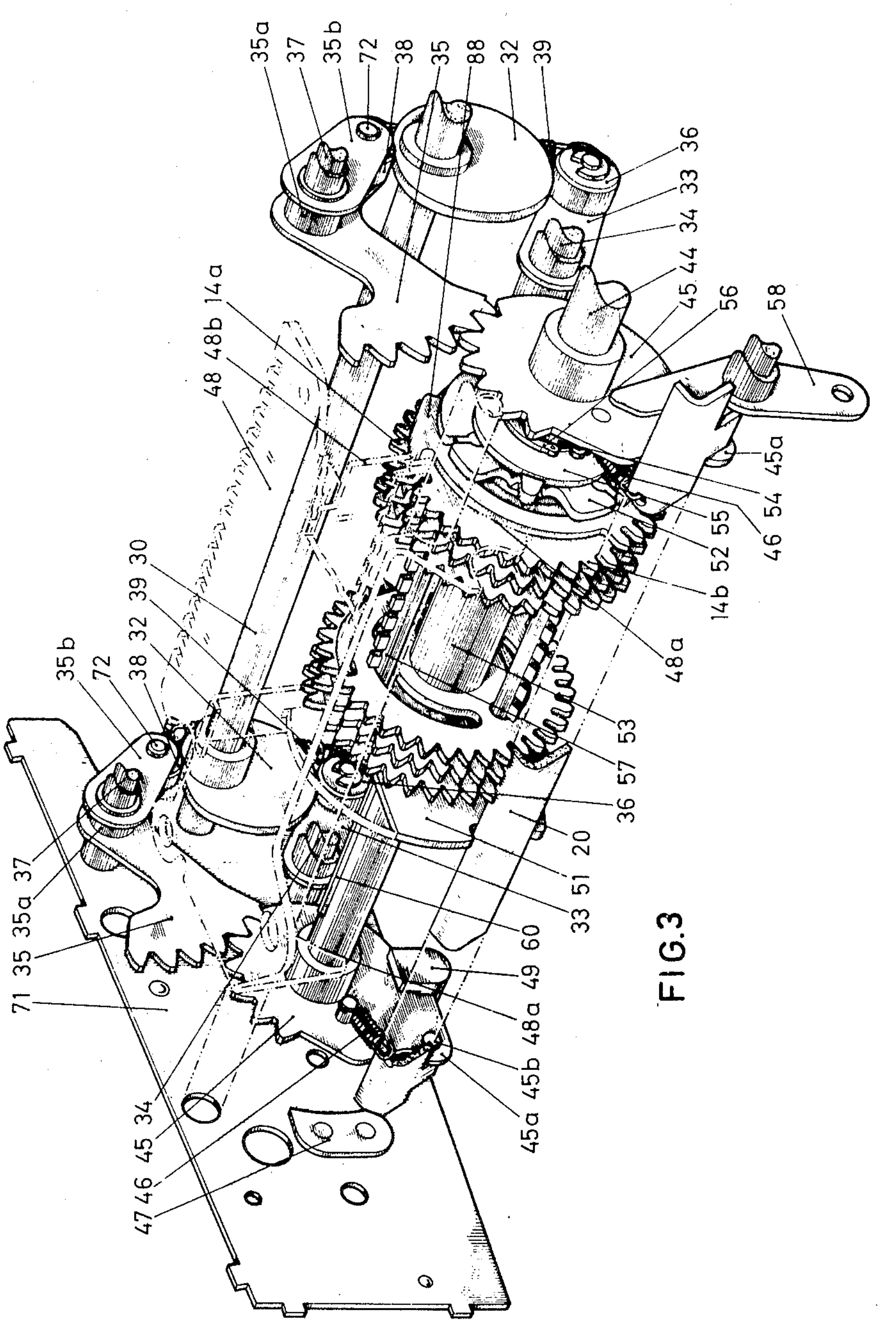
Figure 4:
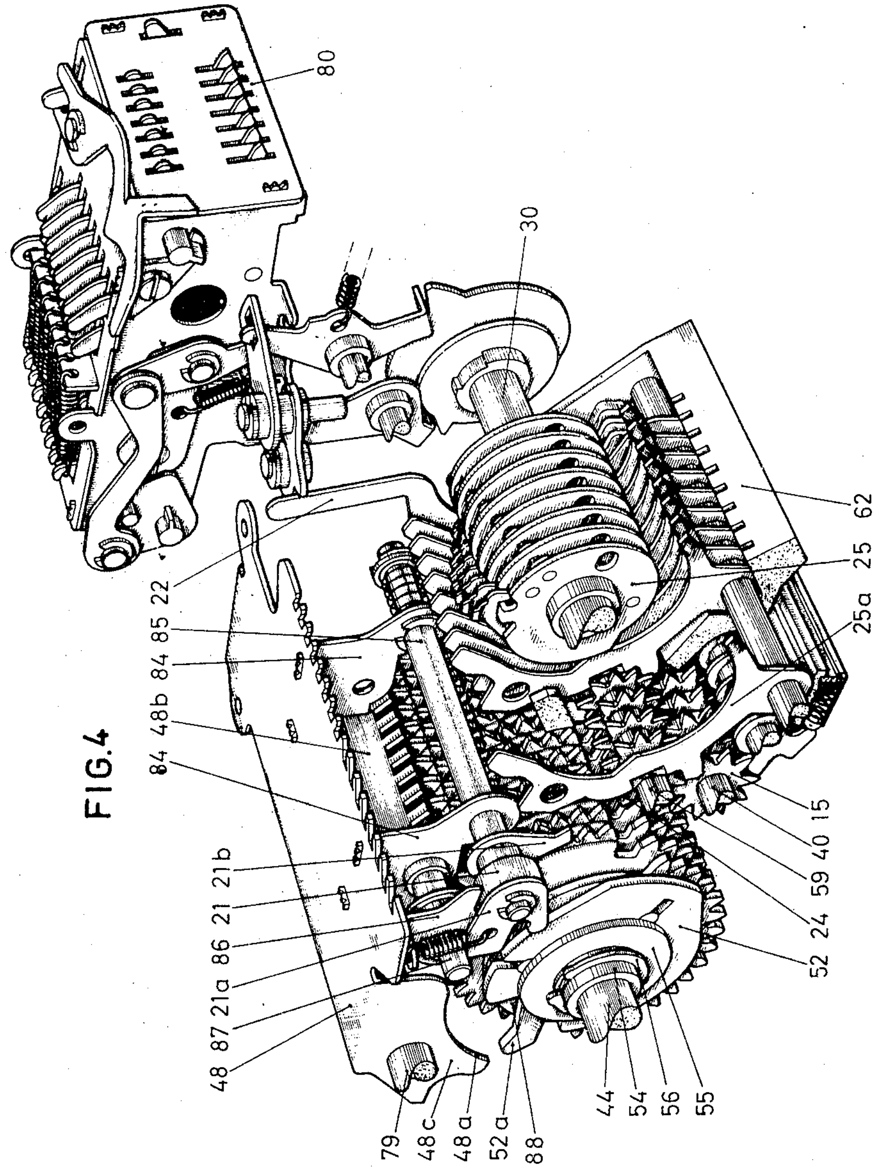
Figure 5:
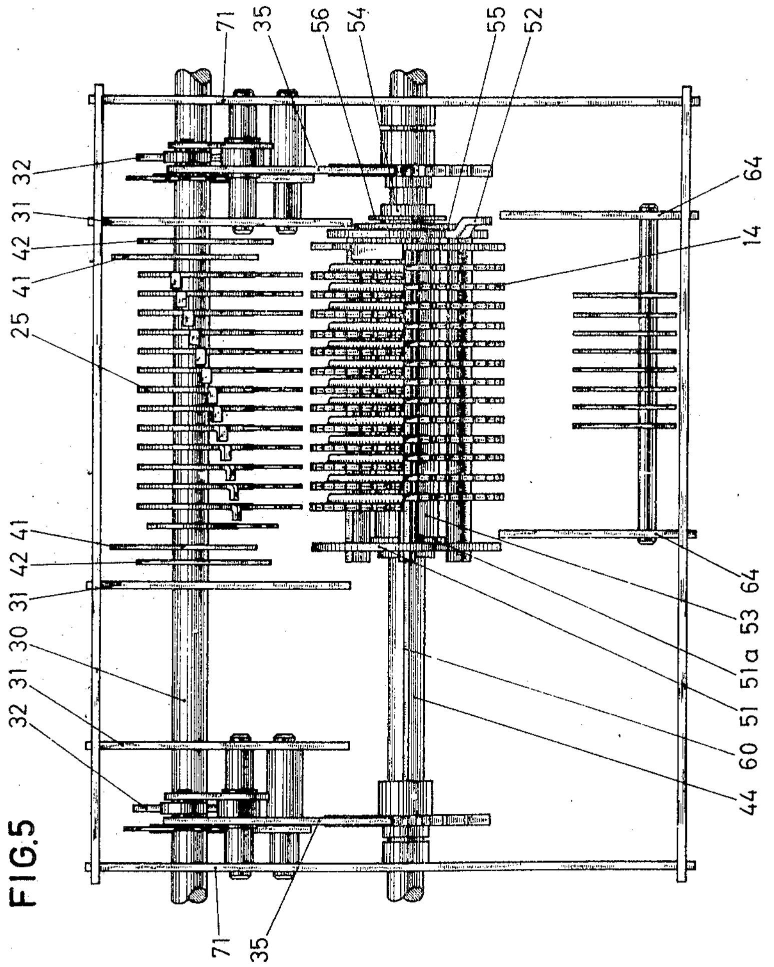

A particularly favourable embodiment of an arrangement according to the invention will be described in the following in greater detail, reference being had to the accompanying drawings in which FIG. 1 is a sectional perspective view illustrating how an arithmetic unit equipped with the arrangement according to the invention is adapted to cooperate with the remaining main components in a calculating machine of the ten-button key set type, FIG. 2 is a view similar to FIG. 1 showing the members which during a calculating operation are adapted to stop the actuator in a proper decade position, FIG. 3 illustrates the construction of the actuator and the drive mechanism, FIG. 4 shows how the actuator is adapted to cooperate with the product register and the successive tens transfer mechanism thereof, FIG. 5 shows the frame of the calculating mechanism in a horizontal sectional view, and FIG. 6 shows a preferred embodiment of an actuator setting disc.

In the embodiment of a calculating machine shown on the drawings and equipped with the arrangement according to the invention, the numbers set in a pin carriage 1 by the keys in conventional manner (FIG. 1) are adapted to be transferred to the arithmetic unit via a set of racks 2. The said racks are provided with longitudinal grooves by which they are displaceably mounted on two transverse shafts 3, 4 the shaft 3 being secured between the end walls (not shown) of the machine and constituting the bearing shaft for a rocker member 5. The shaft 4 is mounted in the two outer arms of the rocker member 5 between which arms the racks 2 are located. On the respective outside of said arms the shaft 4 engages in a slightly S-shaped groove in guide cams 50, one of which is on each side of the machine. Both said cams 50 are secured on a shaft 61 rotatably mounted in the machine frame and both cams are adapted to impart oscillatory motions by a cam set (not shown) the operation of which is controlled from the drive unit. The said motions connect and disconnect the rocker member 5 and thereby the racks 2 to and from the various elements of the arithmetic unit.

In the outer arms of the rocker member 5 and in all of the racks 2 a carrier shaft 6 is mounted for displacement in oblong grooves, the ends of said shaft cooperating with control means (not shown) controlled by the above cam set which is not described in greater detail.

For sensing the numbers set in the pin carriage 1, each of the racks 2 is provided with a pivotally mounted rack hook 19. The lifting movements of said hooks into and out of sensing position take place simultaneously by the action of a shaft 43 extending through slots in the rack hooks 19. The said shaft is secured to lifting means (not shown) which are controlled by a schedule bar or operator (not described in detail) so that the racks are arrested by the hooks when an item set in the keyboard is to be entered in the calculating mechanism.

For cooperation with the various elements of the arithmetic unit, three different sets of intermediate wheels 7, 8, 9 are mounted movably between the arms of the rocker member 5 and in permanent engagement with the racks 2. The central wheel set 8 is mounted movably on a shaft 10 which is stationary in the rocker member 5, and each of the two other wheel sets 7, 9 is mounted movably on a shaft 11, 12 mounted displaceably in the outer arms of the rocker member 5. The displacing motions of the latter are controlled in a way not described in detail by schedule bars (not shown) corresponding to the calculating operations in question. In the lower position of the racks 2, the racks are swung aside. In lifted position, the different intermediate wheel sets 7, 8, 9 are adapted to feed to and from the arithmetic unit mechanisms different numerical values in such a manner, that the intermediate wheel set 7 engages with a set of lower intermediate wheels 13 in the multiplier register, the wheel set 8 engages with a set of setting discs 14 on the actuator, and the wheel set 9 engages with the wheel set 15 of the product register.

All transfer of numerical values to and from the arithmetic unit, thus, is carried out via the racks 2. Hereby it is possible in the calculating machine in question to utilize in a simple way one or two separate memory registers (constant mechanisms, not shown) which in such a case are arranged on one or the other of two transverse shafts 16, 17 in the rocker member 5 on the lower surface of the racks 2, for example for existing constant factors or for the addition of sub-totals.

Via the racks 2 in every individual case also a printing mechanism is set in a printing position corresponding to the numerical value in question, whereafter aligning and printing are carried out in a previously known manner. The printing mechanism is not described in a greater detail, but only illustrated in FIG. 1 with its intermediate wheel set 18. The printing mechanism in its remaining parts can be constructed in conventional manner.

The arithmetic unit shown in adapted to cooperate with the aforesaid main components and to carry out the four usual calculating methods in accordance with the description of the functions as follows.

When an addition or subtraction operation is being started, during the first part of the rotary motion of the drive unit (unit revolution) a clearing of the setting discs 14 of the actuator takes place in a way which will be described below. Thereafter the rack hooks 19 are lifted by the shaft 43 into sensing position against the pin carriage 1, and the rocker member 5 with the racks 2 is swung upwards about its axis of rotation 3, so that the intermediate wheel set 8 engages with the setting discs 14 of the actuator. The carrier shaft 6 is thereafter moved backward, whereby the racks 2 are released and pulled backward by a set of tension springs 63.

During the movement of the racks 2 into contact with the set pins the clearing mechanism of the setting discs 14 is moved to inactive position, and the setting discs 14 via the intermediate wheels 8 are caused to perform rotary motions corresponding to the numerical values set in every decade. Upon the completion of such a transfer of the number to the actuator, a transverse rotor bar 20 is inserted in the tooth gaps of the setting discs 14, thereby locking the discs 14 in their respective assumed positions. At the same time, an aligning mechanism (not shown) engages with the tooth gaps of the racks 2, whereafter the printing of the number keyed in takes place in a previously known manner.

Subsequent to the printing the rocker member is swung back to its starting position, whereby the intermediate wheel set 8 is disconnected from the setting discs 14, and the racks 2 by action of the return displacement of the carrier shaft 6 are forced to return to their starting positions.

Simultaneously, by action of a cam (not shown) dependent on the unit revolution, the actuator is forced to move to its left-hand end position in the arithmetic unit, from which position the actuator is released and pulled by a spring (not shown) to the decade position corresponding to the numbers of significant digits in the number keyed in. For additions and subtractions with integer-numbers the lowest decade wheel of the actuator is in the first decade position wherein the actuator, as in other decades, is adapted to stop in one or the other of two different (half-step) positions for every decade. At such stops of the actuator, the stopping members via a releasing mechanism indirectly cause the start of the drive shaft 30 of the arithmetic unit, whereby the calculating work proper for the actuator is commenced. In one of said half-step positions the impulse initiates an additive operation and in other position it initiates a subtractive operation.

Immediately subsequent to the start of the calculating revolution for the actuator, a shift member 23 is shifted into engagement with the setting discs 14 of the actuator. The said member 23 is mounted rotatably on a shaft 40 and comprises outer arms **23*a*, 23*b* arranged in pairs, which arms are maintained as a unit by an upper shaft 59 extending through the arms. The shaft 40 is rigidly mounted between the two right-hand walls of three intermediate end walls 31 (FIG. 5) forming part of the frame of the arithmetic unit, and between the arms 23*a* of the shift member the calculating wheels 15 of the product register are movably mounted on the shaft 40. The said wheels are arranged to be in permanent engagement with an upper set of intermediate wheels 24 movably mounted on the shaft 59. Both the product register wheels 15 and the intermediate wheels 24 are fixed in the axial direction by grooves freely extending in a guide 62 rigidly mounted between the aforementioned intermediate end walls 31. Upon the start of the actuator the intermediate wheels 24 are adapted, by action of two cams 41 to move into mesh with the setting discs 14, whereby the number set in the actuator can be transferred to the produce register 15** during the forward rotary motion of the actuator.

Subtraction in the product register 15 is effected with the number set in the actuator in one of the aforementioned alternative half-step decade positions, and addition is carried out in the other half-step decade position by subtraction of the complementary figure of the number. A separate transfer member 21 (FIGS. 2 and 4) is provided which for addition operations imparts to the first decade a unit contribution in order to compensate for the complementary figure calculation, so that the term set is given correct numerical value in the product register 15.

During the return movement of the actuator the shift member 23 is disconnected by two guide cams 42, so that the intermediate wheels 24 roll out of engagement with the setting discs 14 and are turned over to cooperate with a successively operating tens transfer mechanism 25 which hereby provides for the necessary tens transfers in the product register 15.

The product register 15, thus, operates as a totaling mechanism, and by sensing the same in a previously known manner, by the intermediate wheel set 9 the final result added up can be transferred to the racks 2 for transfer either to the actuator, printing mechanism or to one or the other of the two memory registers (constant mechanisms).

In a multiplication the multiplier is transferred from the pin carriage 1 via the racks 2 and the intermediate wheel set 7 to a multiplier storage register, and the multiplicand is fed into the actuator according to the setting for addition and subtraction referred to above.

For entering the multiplier into its storage register, the intermediate wheel set 7 is placed in active position in the rocker member 5 when the latter is in its position turned away from the arithmetic unit. Upon the lifting of the rocker member 5, by action of the aforementioned cam set the intermediate wheels 7 are caused to engage with the intermediate wheels 13, and when the racks 2 are moved rearwardly in a previously known manner the number set in the pin carriage 1 is transferred to the multiplier storage register, whereafter aligning and printing take place before the racks 2 are swung aside from the arithmetic unit and return to their starting position.

The multiplying mechanism is a unit ready for installation which comprises between two end walls 64 (FIG. 5) the aforesaid intermediate wheel set 13, one set of arithmetic unit wheels 26, an upper set of intermediate wheels 27 and a single-step transfer mechanism. The end walls 64 are provided with a plurality of lugs (not shown) adapted to engage with a corresponding number of grooves in the arithmetic unit frame for connection to the same during the assembly. Each of the different wheel sets 26, 27 is mounted movably on one of the shafts 65 mounted between the end walls 64, and multiplier storage wheels 26 permanently engage with the two intermediate wheel sets 13, 27. When a number is being set in the multiplier storage register, the different wheel sets, consequently, are given rotary motions corresponding to the numerical value of the multiplier.

The multiplier storage wheels 26 are provided with integral sensing cams (not shown) rendering it possible to carry out the calculations in a shortened way. The said cams are provided with three areas at different distances from the axis against which a set of sensing hooks 28 is urged by spring action. According to the numerical value represented by the position of wheels 26 of the multiplier storage register, the sensing hooks 28 are given different angular positions which, when a multiplication is being carried out are adapted indirectly to control the lateral movements of the actuator and thereby alternatively to stop the actuator in one of two axially different positions for every decade.

The sensing hooks 28 are mounted movably on a shaft 66 secured in the end walls 64, which shaft also supports a movably mounted set of stops 70 the stop of each decade being urged by spring action against the respective calculating wheel 26. The sensing hooks 28 and the stop members 70 are provided with oval holes with a shaft 67 extending therethrough. The said shaft 67 can be moved forwardly to move the hooks 28 as well as the stop members 70 away from the calculating wheels 26 during a setting operation, after the racks 2 have become engaged with the multiplier storage register.

Each of the sensing hooks 28 is provided on its left side (FIG. 1) with a bent-over projection for cooperation with a transfer pin 68*a* on a transfer rotor 68. When a sensing hook senses a setting between 5 and 9 the next decade pin is moved to the left. Thereby the transfer pin is aligned with the intermediate wheel 27 of the next higher decade and when the transfer rotor is oscillated, a unit is entered in the calculating wheel 26 which is in mesh with the wheel 27 referred to. The transfer rotor 68 is mounted pivotally in the end walls 64, its oscillating motion during each calculating revolution being actuated by a mechanism outside of the arithmetic unit (not described in detail). The transfer pins 68*a* which are mounted laterally pivotally in the transfer rotor 68 are adapted in every decade to return to the starting position by action of a spring 68*b* subsequent to the transfer.

The upper free ends of the sensing hooks 28 cooperate with a set of intermediate hooks 81 movably mounted on a shaft 82, which shaft in its turn is movably mounted in a frame 83 mounted above the multiplying mechanism.

The intermediate hooks 81 are urged by spring pressure against the sensing hooks 28. Upon the turning of the latter the said hooks are given corresponding individual settings which, however, can be abolished by the shaft 82 actuated by operation control members for certain calculation functions which are not described in detail.

For a multiplication the actuator is forced to move to its left-hand end position, in the same manner as for addition or subtraction, from which position the actuator is released and drawn by a spring to the decade position corresponding to the highest decade of the multiplier keyed in. The actuator is adapted to stop against the intermediate hooks 81 in one or the other of two axially different positions for every decade, according to whether additive or negative calculation is to be carried out. To this end a rotor yoke 48 co-acting with the actuator is equipped with two stop hooks 73, 74 (FIG. 2), the mutual stop positions of which are offset by half a division in the axial direction. The said stop hooks act in a plane perpendicular to the intermediate hooks 81.

In the aforesaid axial stop positions for the actuator, the actuator is adapted to operate through a number of calculating oscillations corresponding to the numerical value set in the corresponding order of the multiplier storage register, i.e. count the corresponding register wheel back to zero. The computing operation is made in every decade on the shortest possible way, i.e. the sensing areas of the cams on the calculating wheels 26 are selected so, that in every decade the digits one through four are calculated positively and the digits five through nine negatively. The transfer members 68 are adapted automatically to increase by a unit every figure to the left of a figure calculated negatively in order to compensate for the decrease to which the number already set is subjected by the negative calculation.

As already mentioned, the said transfer device 68 acts only on the next higher decade wheel 27 in question. A figure five computed by transfer is calculated positively, whereas a figure five set from the begining is calculated negatively. The third sensing area which corresponds to the figure zero does not exercise via the sensing hooks 28 and the intermediate hooks 81 any stop effect on the lateral displacement of the actuator.

With respect to the control of the counting to zero the actuator is adapted at lateral displacements to carry along a counting wheel 29 which is displaceably mounted on a square shaft 69 movably mounted in the end walls 64, and two diametrically opposite teeth of which are adapted to engage with the intermediate wheels 27. During each of the reciprocating motions of the actuator the shaft 69 and the counting wheel 29 are imparted, in a manner not described in detail, rotary motions in one or the other of two directions, depending on whether positive or negative calculation is to be carried out, and thereby deduct to zero the number fed in every decade into the multiplying mechanism, before the actuator is moved to the next lower decade.

The direction of rotation of the shaft 69 and the accounting wheel 29 is determined indirectly by the axial position of the actautor, which position in its turn is controlled during a multiplication by the angular position of the sensing hooks 28. Hereby the actuator is given in every decade different positions of engagement with the calculating wheels 15 of the product register, in such a manner, that the actuator in one decade position is adapted to impart to the calculating wheels 15 an additive operation by subtraction of the nines complement of the multiplicand, and in the other decade position a subtractive operation by subtraction of the actual multiplicand.

The transfer to the printing mechanim of the result computed in the product register 15 is carried out in the same manner as in adding and subtracting operations.

For a division the conditions are substantially contrary to those for a multiplication. Thus, the dividend is fed into the product register 15 via the actuator, and the divisor is fed into the actuator, whereafter by calculation the quotient is obtained in the multipler storage register.

The accounting of a dividend set in the product register 15 is carried out from higher to lower decades. The lateral movements of the actuator are controlled by a dividing unit 80 (FIGS. 2 and 4) which is a separate unit and rigidly mounted above the frame of the arithmetic unit. The actuator is adapted, in the same manner as in the previous calculating operations, to start the sensing from its left-hand end position and is drawn by action of a spring to the highest decade of the dividend keyed in. The actuator is adapted by a stop bar 75 mounted on the rotor yoke 48 to stop against a minus hook 76 arranged in the highest decade in the dividing unit 80, whereby the actuator is given such a lateral position, that subtraction with the divisor which is set in the actuator can be carried out in the product register 15.

The dividing unit 80 comprises a number of decades corresponding to the quotient capacity, each of which decades is equipped with a negative and a positive stop hook 76, 77 respectively spaced from each other by half a decade division.

In a dividing operation which in principle is based on repeated subtractions to zero of a divisor set in the actuator, which subtractions are repeated by decades, the actuator is adapted with the stop bar 75 to stop against the negative stop hooks 76 in the decades in question, whereby the subtractor unit starts in a manner not described in detail.

As already mentioned, during every calculating oscillation the shift member 23 is operated to cooperate with a successively operating tens transfer mechanism 25 which thereby provides for the necessary tens transfer in the product register 15. During a division this is utilized in such a manner, that a transfer hook 22 mounted in the highest decade of the transfer mechanism 25 is imparted a rotary motion when a decade to be counted passes its "zero position," which rotary motion via intermediate members withdraws from the stop effect of the actuator all negative stop hooks 76 in the dividing unit 80, whereby the actuator is moved to the positive stop hook 77 of the decade in question. In this position the actuator carries out an additive operation revolution with subtraction of the complementary figure of the divisor, thereby compensating for the fact that the actuator has divided one revolution more than required.

Subsequent to such an additive revolution, the positive stop hooks 77 of the dividing unit are disconnected from stopping action by a procedure not shown, in such a manner, that the actuator is moved to the negative stop hook 76 of the next decade and the same procedure is repeated until the division is carried out completely down to the first decade.

The transfer of the quotient from the multiplier or quotient register to the printing mechanism for recording takes place in a manner analogous to the transfer of a product from the product register 15 to the printing mechanism.

All calculating operations, thus, are carried out by cooperation between the actuator, the product register and associated mechanisms. In adding and subtracting operations which comprise dividing calculations the lateral movements of the actuator are controlled by the dividing unit 80, the actuator being stopped against the positive stop hooks 77 of the dividing unit, and the movement by half steps within every decade is determined by operation control means. At an additive operation the actuator is stopped by the stop bar 75, and at a subtractive operation the actuator is stopped by a stop arm 78 pivoted on the rotor yoke 48, which stop arm during the operation is swung into cooperation with the stop hooks 77, the stop position of the stop arm thereby being at a distance of a half decade amount before the stop position of the stop bar 75.

What characterizes the arrangement according to the invention, however, is the manner in which the actuator is arranged for carrying out the operations, and for this reason the following description will deal in a greater detail with the drive, design and mode of operation of the actuator.

In the embodiment of the arrangement according to the invention as it is shown on the drawings, the drive power to the arithmetic unit is transferred from the motor of the calculating machine via a toothed belt (not shown) or the like to a drive wheel (not shown) which is movably mounted on the drive shaft 30 (FIG. 3). The drive wheel is adapted to cooperate with a coupling mechanism (not shown) which upon a start impulse from the stopping members on the rotor yoke 48 causes the drive shaft to be driven by the drive wheel. The drive shaft 30 is movably mounted in the side end walls 71 of the arithmetic unit, and on the drive shaft is rigidly mounted a rotor comprised in the transfer mechanism 25. On each side of the rotor the cams 41, 41 are mounted on the drive shaft 30, and upon the rotation of the latter the cams control the connection and disconnection of the shift member 23 with the setting discs 14 of the actuator.

On the drive shaft, immediately before the respective side end wall 71, there are further mounted two drive cams 32 adapted upon the rotation of the drive shaft 30 to impart reciprocating movements to two drive segments 35. Each of the drive segments 35 is mounted on the respective side on its shaft 37, which shafts are rigidly mounted on the respective sides between the side end wall 71 of the arithmetic unit and an outer intermediate end wall of three intermediate end walls 31 (FIG. 5) comprised in the machine frame. Each of the drive segments 35 is rigidly connected by means of a hub 35*a* with an arm 35*b*, and between the drive segment 35 and the arm 35*a* an easily running roll 38 is mounted on an axle journal 72. By a substantially constant spring action the rolls 38 are urged against the circumference of the drive cam 32 in question. The constant spring action is achieved in that a spring 39 is mounted between the respective drive segment 35 and an arm 33 which is pivoted on a shaft 34 mounted in the end walls 31, 71, and provided with an easily running roll 36 adapted to follow the circumference of the drive cam in question.

The two drive segments 35 are provided with teeth meshing on each side with corresponding teeth on two bar guides 45. The said bar guides are pivotally mounted on a rotor shaft 44 movably mounted in the side end walls 71, and adapted to engage in open bottom grooves on a guide shoulder 49 mounted in the respective side end wall 71, thereby fixing the axial positions of the bar guides 45.

The bar guides 45 are provided with lugs 45*a* on which the transverse locking bail 20 is mounted. Two tension springs 46 urge the locking bail into engagement with the tooth gaps in the setting discs 14 in the actuator. Thereby the discs 14 are locked against individual rotation and, upon rotary motions of the bar guides 45, the actuator wheels are rotated as a unit through a predetermined amount.

During such rotary motions the locking bail 20 is locked in drawn-in position by two guide cams 47 mounted in the side end walls 71 of the arithmetic unit, in cooperation with a pair of guide cams 48*a* provided on a rotor yoke 48 laterally cooperating with the actuator, which yoke will be described below in greater detail.

The disengagement of the locking bail 20 in the starting position of the actuator is effected via a carrier arm 58 pivoted in the right-hand side end wall 71 by action of the aforementioned cam set for operation control, in such a manner, that the locking bail 20 is imparted an oscillating motion about the guide pins 45*b* in the bar guides 45.

The rotary motions of the actuator and of the bar guides 45 by action of the drive segments 35 are limited for safety reasons, in that the locking bail 20 in the upper turning position strikes against a stop shoulder (not shown) mounted in each side end wall 71 while in the lower turning position the actuator is stopped by the striking of the respective lugs 45*a* of the bar guides against the guide shoulders 49.

As mentioned before, the actuator comprises a number of setting discs 14. The discs are pivoted on a sleeve 53 between two end discs 51, 52, of which end discs the left-hand disc 51 is rigidly connected by a hub 51*a* (FIG. 5) with the sleeve 53, and the right-hand disc 52 is mounted so that it can be assembled on a hub 54 rigidly mounted in the other end of the sleeve 53. The central hole of the end disc 52 is provided with diametrically opposite flat portions corresponding to milled planes on the hub 54, whereby the position of the end disc 52 is fixed in relation to the end disc 51. In axial direction the end disc 52 is locked against a shoulder on the hub 54 by a curved washer 55 and a groove slider (Seger lock) 56 applied in a groove on the hub 54.

The axial spacing of the setting discs 14 in the actuator are determined by three clearing shafts 57 provided with cams, which shafts pass through circumferential slots in the setting discs 14, and teeth on which to guide the discs 14 for rotation while in correct lateral position. The shaft ends are supported in angularly offset bayonet grooves in the end discs 51, 52, whereby the shafts 57 upon the clamping of the right-hand end disc 52 are locked both in the radial and axial position.

Each of the setting discs 14 is provided with two different outer tooth tracks 14*a*, 14*b* which are laterally offset in relation to one another corresponding to half the distance between two setting discs 14. Thus either the positive tooth tracks 14*a* or the negative tooth tracks 14*b* of the actuator wheels may be caused to engage with the intermediate wheel set 24 of the product register.

The negative tooth track 14*b* is extended and comprises also the setting teeth cooperating via the intermediate wheels 8 with the respective racks 2. Thereby the setting discs 14, upon a sensing operation of the pin carriage 1, can be given individual settings corresponding to the numerical values in question. In such an operation, as in a clearing operation of the setting discs 14, the locking bail 20 is disengaged.

In the latter operation the shafts 57 are given a motion about the rotor shaft 44 by the end discs 51, 52, which discs in their turn are given a rotary motion via the rotor shaft 44 by the aforementioned cam set for operation control. The latter is provided with a longitudinal key 60 adapted to engage with the hub 51*a* of the left-hand end disc and to carry along the end discs 51, 52 in the rotary motions of the rotor shaft 44. Hereby the setting discs 14 are taken along to abutment with the positive tooth track 14*a* against a stop cam 48*b* provided in the rotor yoke 48, which cam is equipped with a toothing corresponding to the division between the setting discs 14 and allows for a free movement of the negative tooth tracks 14*b* of the discs.

As already mentioned, the clearing of the setting discs 14 takes place at the beginning of each drive shaft rotation, and the clearing shafts 57 return to starting position before a new number setting is made in the actuator.

The rotor yoke 48 cooperating with the actuator is movably mounted on a shaft 79 (FIGS. 1 and 4) secured in the side end walls 71. By means of a downwardly bent arm not shown in detail on the drawings, the rotor yoke 48 is adapated to engage with and to be supported by a carrier groove provided in the actuator, whereby the rotor yoke 48 is fixed in axial direction in relation to the actuator.

The rotor yoke 48, furthermore, is adapted by a downwardly bent arm 48*c* (FIG. 2) to engage with a bottom groove on the counting wheel 29, whereby the axial position of the latter becomes directly dependent on the lateral position of the actuator.

On the lower surface of the rotor yoke 48 there are also mounted two bearing plates 84 carrying a shaft 85 (FIG. 4) adapted to be rotated and axially displaced. On a pin turned into one end of said shaft the transfer member 21 is movably mounted. The said member is adapted to cooperate with a locking member 86 which in its turn is movably mounted on a shoulder pin 87 secured in one of the bearing plates 84. Such a cooperation which was caused at resetting operations in connection with the shortening of numbers, also is conditioned by the cooperation with an elevation disc 88 mounted on the rotor shaft 44 and before the setting of disc 14 of the first decade, in such a manner, that the locking member 86 in a manner not described here controls the relative lateral position of the transfer member 21 and the shaft 85. In usual calculating operations the locking member 86 has no proper function, while the transfer member 21 is active during every period for the actuator.

The end disc 52 by an outwardly bent tooth 52*a* operates the carrier arm 21*a* of the transfer member at every forward rotary motion for the actuator, the transfer arm 21*b* of the transfer member at an additive calculating position for the actuator being adapted to actuate a transfer hook 25*a* mounted before the lowest engaged decade wheel of the product register 15, whereby the lowest decade at such operation is given a unit contribution. At a negative calculating position for the actuator the transfer arm 21*b* passes at its swinging sideways of the transfer hook 25*a*, so that at such operations no additional transfers are obtained in the product register.

What I claim is:

1. In a calculating machine having a register comprising a series of toothed wheels and cyclically oscillatable digital actuators individually rotatably settable to represent digital values and corresponding complementary values, means operable during a cycle to engage the register with said actuator, means operable during a cycle to position the actuator for engagement to select a desired one of said values for entry, means to oscillate said actuator through a predetermined amount to enter one of said values into said register, and means controlling said engaging means to disengage said register and oscillate said actuator in the reverse direction to starting position, said digital actuators comprising two tooth tracks offset axially, said complemenary value tracks comprising nine teeth and said digital value track having a tooth omitted adjacent each end of said complementary value track and wherein said predetermined amount is the angle subtended by ten teeth.

2. A calculating machine according to claim 1 wherein said digital actuators in initial zero position are rotatably positioned with the space formed by the omitted tooth at one end of said complementary track in position to be entered by a tooth of said register wheel.

3. A calculating machine according to claim 1 wherein said means to select a desired one of said values comprises a carriage for said actuator movable axially to position either said digital value tracks or said complementary value tracks in position to be engaged by said register wheels.

References Cited

UNITED STATES PATENTS

| | | | |
|---|---|---|---|
| 3,268,165 | 8/1966 | Gelling | 235—60 |
| 3,279,692 | 10/1966 | Mueller et al. | 235—60 |
| 3,367,568 | 2/1968 | Gang | 235—60 |
| 3,372,868 | 3/1968 | Gang | 235—63 |
| 3,001,701 | 9/1961 | Frobel | 235—63 |
| 3,032,261 | 5/1962 | Lydfors | 235—60 |
| 3,037,691 | 6/1962 | Kuhn | 235—60 |

STEPHEN J. TOMSKY, Primary Examiner

U.S. Cl. X.R.

235—60